United States Patent [19]
Hildebrand

[11] Patent Number: 4,756,615
[45] Date of Patent: Jul. 12, 1988

[54] PORTABLE FOLDING MICROFORM READER

[75] Inventor: Donald A. Hildebrand, Oriskany, N.Y.

[73] Assignee: The United States of America as represented by the Secretary of the Air Force, Washington, D.C.

[21] Appl. No.: 927,019

[22] Filed: Nov. 5, 1986

[51] Int. Cl.$^4$ .............................................. G03B 21/00
[52] U.S. Cl. ...................... 353/74; 353/119; 353/25; 353/27 R
[58] Field of Search .................... 353/119, 74–77, 353/25, 27 R, 27 A, 101, 97, 72, 121, 122; 350/96.18, 96.23, 96.25, 96.26

[56] References Cited

U.S. PATENT DOCUMENTS

| | | | |
|---|---|---|---|
| 2,472,098 | 6/1949 | Duncan | 353/12 |
| 3,016,785 | 1/1962 | Kapany | 350/96.25 |
| 3,143,589 | 8/1964 | Brault et al. | |
| 3,267,801 | 8/1966 | Abbott, Jr. et al. | |
| 3,680,948 | 8/1972 | Sussman et al. | |
| 3,791,728 | 2/1974 | Kaye et al. | |
| 3,897,144 | 7/1975 | Hicks | 353/12 X |

FOREIGN PATENT DOCUMENTS

| | | | |
|---|---|---|---|
| 831084 | 5/1938 | France | 353/74 |
| 1231770 | 4/1960 | France | 353/27 R |
| 512183 | 8/1939 | United Kingdom | 353/79 |
| 2092867 | 8/1982 | United Kingdom | 350/96.25 |

Primary Examiner—Harry N. Harojan
Attorney, Agent, or Firm—Jules J. Morris; Donald J. Singer

[57] ABSTRACT

A portable microform reader 10 comprising a foldable frame 12. The frame includes a view screen 14 and a microform holder 18. A microform 38 is illuminated by a light package 80 and an image of a portion of the microform 38 is projected through pick up lens 48. A fiber optic cable 22 carries the image from the objective lens 48 to a focusing lens 52 which projects a magnified image onto the view screen 14. Pickup lens assembly 20 is moved manually to view different areas of the microform.

15 Claims, 2 Drawing Sheets

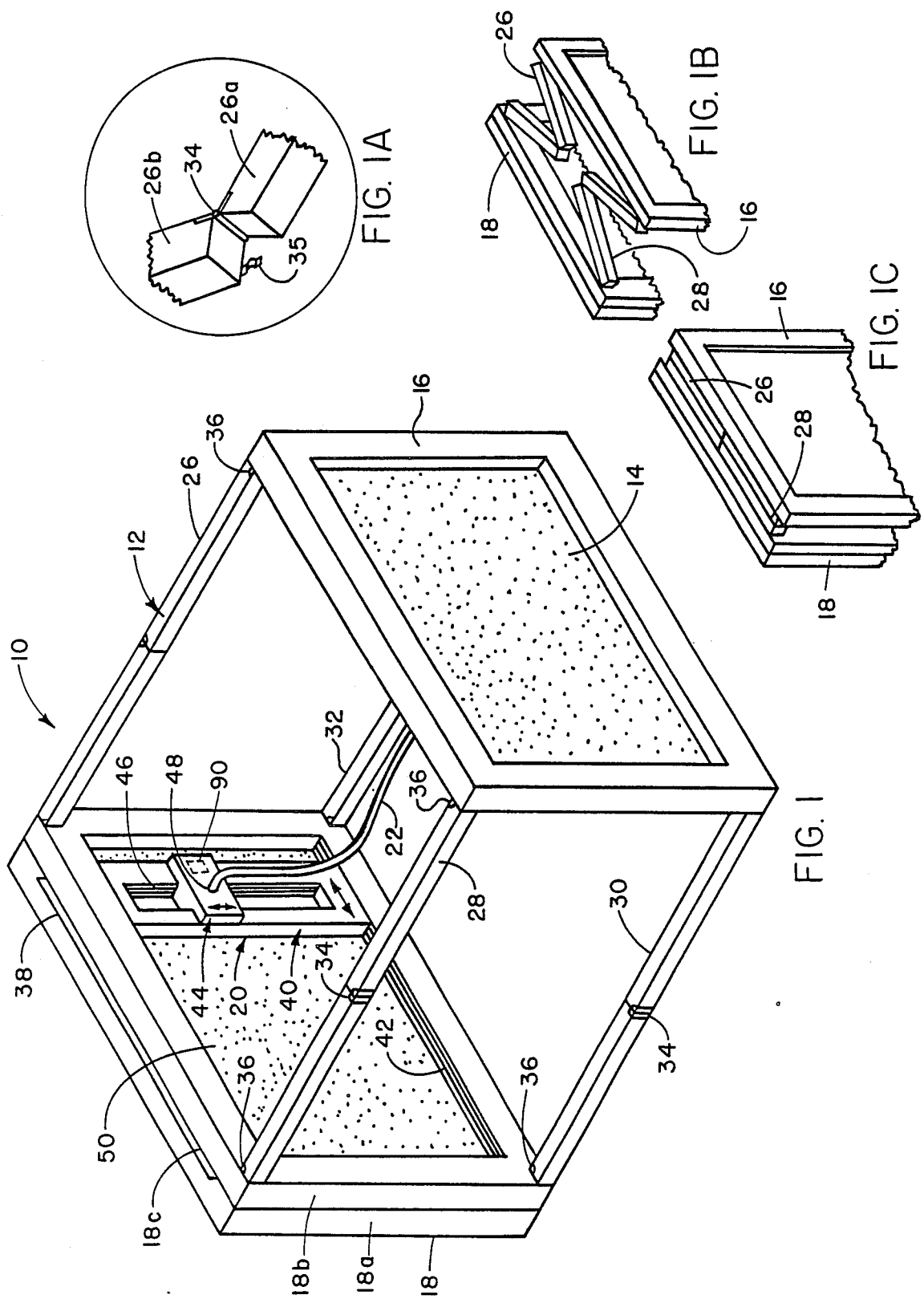

PORTABLE FOLDING MICROFORM READER

STATEMENT OF GOVERNMENT INTEREST

The invention described herein may be manufactured and used by or for the Government for governmental purposes without the payment of any royalty thereon.

TECHNICAL FIELD

This invention relates to microform readers and particularly pertains to lightweight portable microform readers arranged for easy storage and temporary use.

BACKGROUND OF THE INVENTION

Microform and microfilm readers have been widely used for at least the last twenty years. These readers are generally bulky machines that are used in an office or factory to recall stored information printed on microfiche or microforms. Most commonly, this information comprises parts lists, drawings or records concerning manufactured products. Other uses include the storage of facsimile copies of historical documents, patient records, magazines and newspapers.

In applications relating to manufactured products, field maintenance of vehicles and machines may require only occasional reference to microforms. Use of a standard microform reader in the field is inefficient since it requires the maintenance of a relatively large and unwieldy device for occasional consultation. This is certainly a poor use of space in many confined areas. Microform readers are therefore often retained only at central locations and are unavailable in the field for consultation by a technician or repairman. It is ironic that microform storage of valuable information saves great amounts of space but may limit access to that information.

In view of the above a need exists for a portable, lightweight microform reader that can be easily stored and transported. Such a reader would greatly increase the value of microform and microfiche information storage since it would greatly increase microform accessibility to field and factory personnel. Previous attempts have therefore been made to produce foldable and portable machines. These attempts have not been completely successful due to a number of circumstances.

Primarily, an outstanding problem with collapsible microform machines is that the movable nature of the structure results in inferior optics which make it very difficult to read the microform. Poor optics result from slight variations in the distances between the lenses due to the lack of rigidity of portable machines.

Another problem with such machines has been their relatively high weight resulting from the use of conventional glass screens and optics. Machine weight must be reduced to permit truely portable machines.

In view of the above it is an object of the present invention to provide a lightweight portable microform reader having superior optics.

It is a further object of the present invention to provide a portable microform reader which can be easily assembled and disassembled.

It is yet another object of this invention to provide a microform reader that can be easily stored in a small space.

SUMMARY OF THE INVENTION

The invention comprises a fiber optic portable microform reader. The microform reader consists of a folding reader frame having two set positions, a storage position and an extended operational position.

The reader further comprises a view screen attached to a first face of the reader frame and a microform holder attached to a second face of the reader frame. The microform holder is designed for retaining a microform (or microfiche) in a desired position.

In the preferred embodiment of the invention a pickup lens assembly is movably attached to the second face of the reader frame for transmitting an image of a portion of the microform. It is preferred that the pickup lens assembly comprise a first sliding element capable of movement in one linear direction and a second sliding element capable of movement in a second linear direction. The sliding elements together provide free movement of the pickup lens within a plane that is parallel to the plane of the microform examined.

A further aspect of the preferred embodiment of the portable microform reader comprises a focusing lens assembly attached to the first face of the reader frame. The focusing lens assembly is for projecting an enlarged image of the microform upon a view screen. A fiber optic cable connects the pickup lens assembly to the focusing lens assembly and transmits a coherent image of a portion of the microform from said pickup lens to the focusing lens. In a preferred embodiment of the invention, the view screen, pickup and focusing lenses are made of plastic material to decrease the weight of the portable microform reader.

In a further preferred embodiment of the invention the collapsible frame comprises frame legs having hinges. The hinges allow the legs to fold during storage of the microform reader in which the reader is folded into a flat package.

In another preferred embodiment the microform reader further comprises a light source for illuminating the microform in order to produce an illuminated image at the pickup lens. The light source comprises a fluorescent light assembly that is attached to the second face of the reader frame.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

FIG. 1 is a perspective view of a portable microform reader;

FIG. 1A is an expanded perspective view of a reader frame leg;

FIG. 1B is a partial perspective view of the microform reader of FIG. 1 after it has been partially folded;

FIG. 1C is a partial perspective view of the microform reader of FIG. 1 after it has been completely folded;

DETAILED DESCRIPTION OF THE INVENTION

Figure 3:
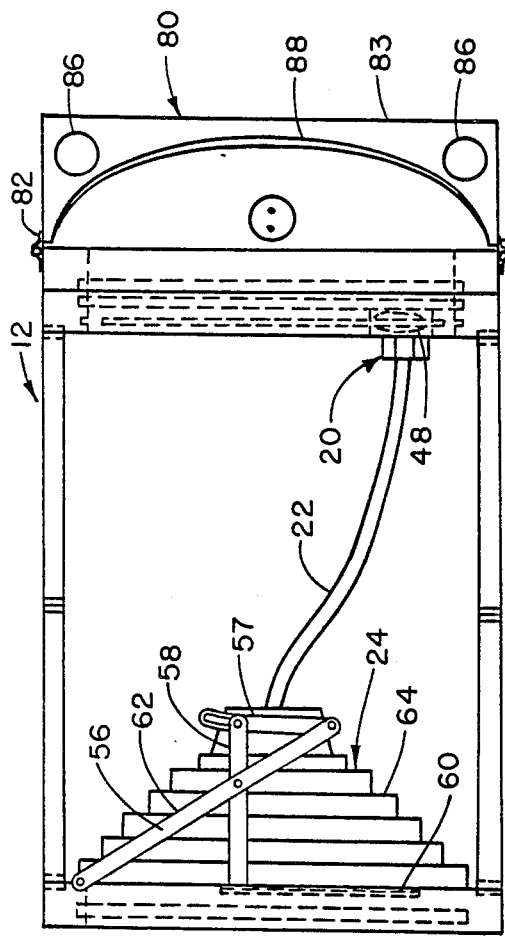
FIG. 3 is a side view of the portable microform reader of FIG. 1.
Figure 2:
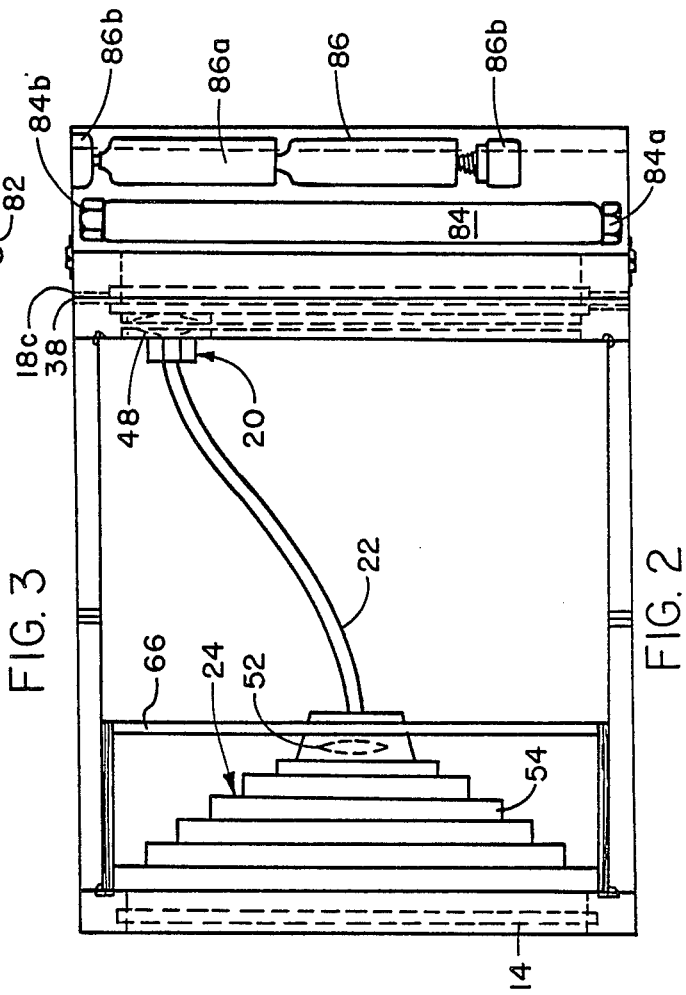
FIG. 2 is a top view of the portable microform reader of FIG. 1.
Figure 4:
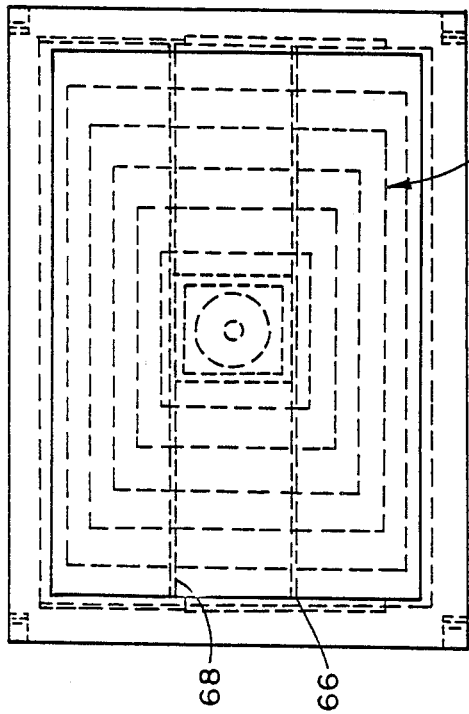
FIG. 4 is a front view of the portable microform reader.

The invention comprises a portable microform reader 10 which is depicted in the perspective view of FIG. 1 and in the plan views of FIGS. 2-4 in its extended position ready for use in examining microforms or microfiche.

The portable microform reader is assembled on a collapsible frame 12. A view screen 14 is positioned on a front portion of the frame 16. A microform (or microfiche) is held in a microform holder portion of the frame 18 and the image of a portion of the microform is transmitted from a pickup lens assembly 20 through a fiber optic cable 22 and a focusing assembly 24 (FIG. 2) onto a translucent screen 14.

The reader frame 12 comprises four collapsible legs 26, 28, 30 and 32 that hold the microform holder 18 and the screen 14 at desired positions during use. The legs 26, 28, 30 and 32 are provided with central hinges 34 and end hinges 36 that facilitate their folding to the collapsed storage position. The legs are folded inwardly as shown in FIG. 1A. A spring metal (or plastic) latch 35 is provided to hold the legs in the open position during use. The latch 35 is attached to leg 26b and cooperates with a detent (not shown) on leg 26a. It is also possible to use magnetic latches or telescoping legs for the extension and storage of the reader frame.

As the legs 26, 28, 30 and 32 are folded inward the ends of the frame 16, 18 collapse towards each other as shown in FIG. 1B. The completely folded microform reader is flat (FIG. 1C having only enough room inside to store the internal components discussed below, and the flexible fiber optic cable 22.

The reader frame is extended in use to permit free flexing of the fiber optic cable 22 and adjustment of the pickup lens assembly 20 to a desired position adjacent to a microform positioned in the microform holder 18. The objective lens 48 of the pickup lens 20 views only a portion of the microform 38.

The translucent screen 14 is positioned on the front face 16 of frame 12. This translucent screen is preferably made from a durable lightweight plastic such as LEXAN. Plastics are considerably lighter than glass and add to the portability of the machine. Further, LEXAN-type plastics are clear and unbreakable, their use reduces the chance of screen damage during transit.

The microform 38 is held for viewing in microform holder 18. Microform holder 18 comprises two holder frame sections 18a, 18b and a slot 18c for placement of the microform 38. It is generally necessary to protect the microform from possible damage by providing an exterior translucent screen 50 (behind microform 38). This screen is similar in construction to view screen 14 and is translucent to allow the entry of light from behind the microform holder 18. Light to project an image through the lenses can be provided either from a natural light source or by an artificial light. A transparent screen can also be positioned between pickup lens assembly 20 and the microform in order to further protect the microform.

The pickup lens assembly 20 is positioned for movement adjacent to the microform holder 18. A first slide assembly 40 is provided for right to left movement in track 42 and an identical top track (not shown) of the microform holder 18 (FIG. 1). A second slide assembly 44 moves in vertical tracks 46 formed on both sides of the interior surface of the first slide assembly 40. The combination of vertical movement by slide assembly 44 and horizontal movement by slide assembly 40 allows for movement of objective 48 anywhere within a lens plane parallel to the microform 38.

In this invention, unlike conventional microform readers, the microform is not moved to change the display at screen 14. Instead the relatively small pickup lens is moved to the various areas of the microform. The slide assembly 44 has a light press fit within tracks 46 in order to prevent gravity from causing it to fall during viewings. The objective position can, however, be easily moved by hand. The use of a movable objective makes it possible to have a local light source rather than a general light source for illuminating the microform in order to provide clear image transmission to view screen 14.

The image from the object lens 48 is transmitted through a coherent fiber optic cable 22 to the focusing lens assembly 24 (shown in FIGS. 2-4). The coherent fiber optic cable preferably comprises a single flexible filament or bundle of flexible glass or plastic filaments that are maintained in constant relation to each other through the length of the cable. Maintaining multiple filaments in a predetermined relationship to each other throughout the length of the cable makes possible the transmission of coherent images from the object lens 48 to be focusing assembly 24. Use of a fiber optic cable holds constant the distance (i.e., the length of the cable) between the object lens 48 and the focusing assembly 24. This greatly alleviates problems generally associated with portable optic device. The image distance between the object and focusing lenses is completely unaffected by the folding frame 12 since the fiber optic cable remains at the same length. The image at the focusing lens is therefore unaffected by variations in the relative positions of the microform and the view screen.

As can be seen in FIG. 2 the fiber optic cable 22 terminates adjacent to a focusing lens 52 which is part of the focusing assembly 24. The focusing lens is positioned in a lens diaphragm, or bellows, 54 that is used to position the lens 52 relative to the fiber optic cable 22 and the view screen 14 in order to form a clear magnified image on the screen 14. This diaphragm 54 also prevents outside interference with the image projected by lens 52 to provide a clear image.

Figure 5:
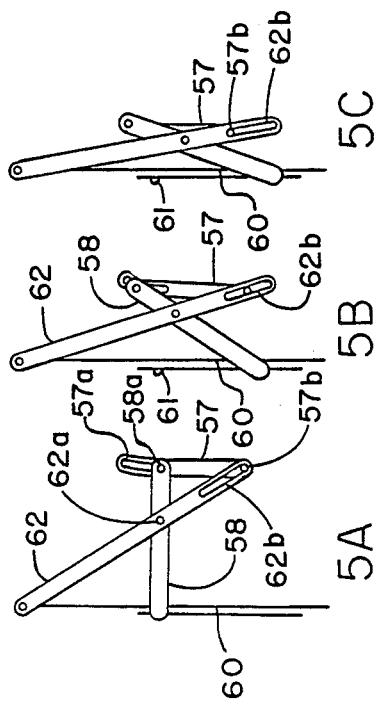
FIG. 5 comprises three plan views (5a, 5b, 5c) which show the folding action of the diaphragm supports of FIG. 3.

The diaphragm 54 is maintained at its extended focus distance during usage by links 56, 57 and 58. These links are similar to those used in cameras having similar folded diaphragms. When extended, link 58 is brought to the horizontal position and locked in notch 61 to maintain focusing lens 52 at a predetermined location to provide a focused image at screen 14 (FIGS. 5A, 5B and 5C). The linkage establishes a fixed focus for producing a clear image at screen 14, however, an adjustable linkage can be used if desired. For example, a series of notches 61 would provide a number of focal distances. A linkage identical to the scissor type linkage of links 56, 57 and 58 is also formed on the far side of the diaphragm 54 (not shown). The two scissor-type linkages are connected by means of cross bars 66 and 68 (FIG. 2, FIG. 4). These cross bars combine with the scissor linkages to form a small frame support structure which supports the focusing lens 52, the diaphragm 24 and the fiber optic cable 22 in both the storage and operating positions.

The links can be easily collapsed to a flat form by releasing link 58 from notch 61 and sliding it along channel 60. This results in link pin 58a sliding in slot 57a and link 62 swinging clockwise around pivot pin 62a as pivot pin 58a slides through slot 57a. As link 58 is moved further along slot 60 the structure flattens as rotation of link 62 causes pin 57b to travel in slot 62b and draw link 57 adjacent to channel 60 and into a flat storage position.

The microform reader can also be provided with a detachable light package 80 as shown in FIGS. 2 and 3. This light package can be secured for storage by means of conventional latches 82 or bolts which attach to frame 12.

The light prackage comprises a case 83, a fluorescent light 84 with terminals 84a, 84b and two battery packs 86. In addition, the light package comprises a cylindrical parabolic reflector 88. The fluorescent light 84 is centered at the focal line of the reflector to evenly deliver light to the rear of the microform 38. The battery packs 86 power the light through wires (not shown) and comprise batteries 86a and terminals 86b.

The light package may alternatively a movable light assembly which comprises a sliding light which tracks with pick up lens assembly 20. This movable light comprises merely a conventional flat style flashlight mounted to a pedestal identical to the second slide assembly 44. This forms part of an assembly identical in operation to pickup lens assembly 20.

The sliding light therefore is capable of movement exactly coincident with objective 48 but is positioned at the location of light package 80. The light is driven to follow slide assembly 44 by concealed magnets 90 (FIG. 1) mounted in both assembly 20 and the movable light assembly.

The movable light assembly only lights that portion of the microform adjacent to the pickup lens assembly. Since a less powerful light is required than when general lighting is required, a small battery powered light similar to those used in flashlights is all that is required to operate the microform reader. Various other forms of light attachments can be used with this device. The detachable light source 80 provide a convenient means for illuminating the entire microform.

The optics of this device can be varied as desired to provide proper magnification of the microform. Standard magnification of microform varies between 10× magnification and 64× magnification. Enlargements in this range pose no problem for the portable microform reader since it would be possible to provide a microform reader with exchangeable focusing lenses so that a variety of microforms, requiring different levels of magnification can be examined.

Since the lens, viewing screen and backscreen 50 are constructed from plastic material, a lightweight and rugged device is provided. The portable microform reader therefore can be easily transported or stored until required for use. Unlike conventional microform readers this device is sufficiently portable and durable to be utilized in field operations or in offices where reference to microform material is only occasionally necessary. The flat storage shape of the microform reader eases microform storage space requirements.

While the invention has been particularly described with reference to the preferred embodiments thereof, it will be understood by those skilled in the art that various changes in substance and form can be made therein without having departed from the spirit and the scope of the invention as detailed in the attached claims. For example in some instances it may not be necessary to provide a discrete object pickup lens 48. It is possible to sufficiently bond and polish ends of fiber optic cables such as cable 22 to form integral lenses at the ends of the cable. It may also be possible to form a focusing lens integral with the transmitting end of a cable proximate to the view screen.

I claim:

1. A portable microform reader comprising:
   (a) a collapsible reader frame;
   (b) a view screen mounted to a front viewing portion of said frame;
   (c) a microform holder attached to a rear portion of said reader fame, said microform holder for the positioning of a microform;
   (d) a pickup lens assembly movably mounted to said reader frame adjacent to said microform holder wherein said pickup lens assembly comprises a first sliding element capable of movement in one linear direction and a second sliding element capable of movement in a second linear direction, the two sliding elements together providing free movement of a pickup lens within a lens plane;
   (e) a focusing lens assembly mounted to said reader frame adjacent to said view screen for focusing a light image on said view screen wherein said focusing lens assembly comprising a folding lens diaphragm for holding a focusing lens stationary at a desired distance from said view screen during usage and for positioning said focusing lens closely adjacent to said screen during storage; and
   (f) a coherent fiber optic cable mounted at a first end adjacent to said focusing lens assembly and mounted at a second end adjacent to said pickup lens for movement therewith and for transmitting a light image from said pickup lens assembly to said focusing lens assembly.

2. The portable microform reader of claim 1 wherein said collapsible frame further comprises frame legs having hinges said hinges for folding said legs during storage of said microform reader.

3. The portable microform reader of claim 2 wherein said view screen further comprises a translucent plastic viewing panel.

4. The portable microform reader of claim 1 wherein said first sliding element is mounted to said frame adjacent to said microform holder.

5. The portable microform reader of claim 4 wherein said second sliding element is mounted to said frame adjacent to said microform holder.

6. The portable microform reader of claim 1 wherein said lens plane is parallel to the microform.

7. The portable microform reader of claim 1 wherein the microform holder further comprises a translucent screen for permitting back illumination of the microform.

8. The portable microform reader of claim 1 wherein said focusing lens assembly further comprises diaphragm locking means for fixing said diaphragm in a desired position relative to said view screen.

9. The portable microform reader of claim 7 further comprising a light source for transmitting light through said microform in order to transmit an illuminated image through said pickup lens assembly.

10. The portable microform reader of claim 9 wherein said light source is detachable from said reader frame.

11. A portable microform reader comprising:
(a) a folding reader frame having a storage position and an extended position such that in said extended position said reader frame forms a rectangular box;
(b) a view screen fixedly attached to said reader frame at a first face of said reader frame;
(c) a microform holder attached to said reader frame at a second face of said frame, said microform holder for retaining a microform in a desired position;
(d) a pickup lens assembly movably attached to said second face of said reader frame, said pickup lens assembly for transmitting an image of a portion of said microform wherein said pickup lens assembly comprises a first sliding element capable of movement in one linear direction and a second sliding element capable of movement in a second linear direction, the two sliding elements together providing free movement of a pickup lens within a plane;
(e) a focusing lens assembly attached to said first face of said reader frame, said focusing lens assembly for projecting an enlarged image of said micorform upon said view screen wheren said focusing lens assembly comprises a folding lens diaphragm for holding a focusing lens stationary at a desired distance from said view screen during usage and for positioning said lens closely adjacent to said screen during storage; and
(f) a fiber optic cable attached at a first end to said pickkup lens assembly and at a second end to said focusing lens assembly, said fiber optic cable for transmitting a coherent image of a portion of said microform from said pickup lens to said focusing lens.

12. The portable microform reader of claim 11 wherein said first sliding element is mounted to said frame adjacent to said microform holder.

13. The portable microform reader of claim 11 wherein the microform holder further comprises a translucent screen for permitting back illumination of the microform.

14. The portable microform reader of claim 13 further comprising a light source for transmitting light through said translucent screen to illuminate said microform.

15. The portable microform reader of claim 11 wherein said view screen comprises a translucent plastic panel.

* * * * *